United States Patent [19]

Warner et al.

[11] Patent Number: 4,821,993

[45] Date of Patent: Apr. 18, 1989

[54] RETAINING BRACKET FOR DETACHABLE PUMP

[75] Inventors: Steven D. Warner, Naperville; William C. Swick, Downers Grove; David M. Anderson, Clarendon Hills, all of Ill.

[73] Assignee: J. I. Case Company, Racine, Wis.

[21] Appl. No.: 140,496

[22] Filed: Jan. 4, 1988

[51] Int. Cl.⁴ .............................................. F16M 1/04
[52] U.S. Cl. ...................................... 248/674; 248/667
[58] Field of Search .............. 248/674, 659, 661, 667, 248/666, 675, 670, 53, 65, 70, 284, 286, 669

[56] References Cited

U.S. PATENT DOCUMENTS

| | | | |
|---|---|---|---|
| 1,797,169 | 3/1931 | Robinson | 248/53 |
| 2,311,811 | 2/1943 | Beasley | 246/674 |
| 2,776,757 | 1/1956 | Schoenlaub | 248/286 |
| 3,190,423 | 6/1965 | Wenning | 248/70 X |
| 3,620,644 | 11/1971 | McLarty | 248/674 |

OTHER PUBLICATIONS

Case/IH 850 Grail Drill Operator's Manual, J. I. Case Company, pp. 1–5, Jul., 1986.

Primary Examiner—Alvin C. Chin-Shue
Attorney, Agent, or Firm—Dressler, Goldsmith, Shore, Sutker & Milnamow Ltd.

[57] ABSTRACT

A retaining bracket for detachably connecting a pump to the power take off shaft of a tractor. The bracket provides a torque restraint which is non-rigid and centrally positioned in substantial alignment with the longitudinal axis of the pump shaft so that angular moments of force which would tend to bend the pump shaft are avoided or resisted. The bracket includes a channel-shaped member having a telescopic web and no precision alignment is required to operationally mount and connect the pump to the tractor. The bracket includes a slidable connection to the tractor drawbar so that no tools are required for operational mounting.

6 Claims, 1 Drawing Sheet

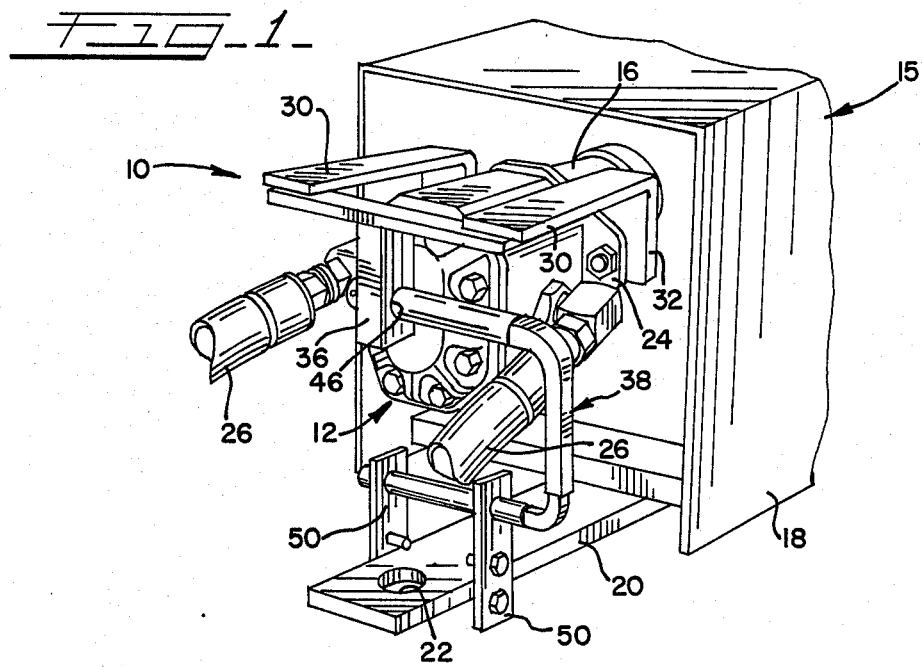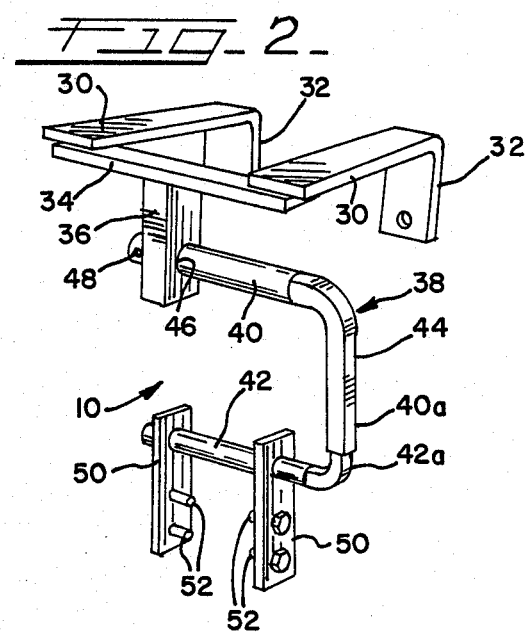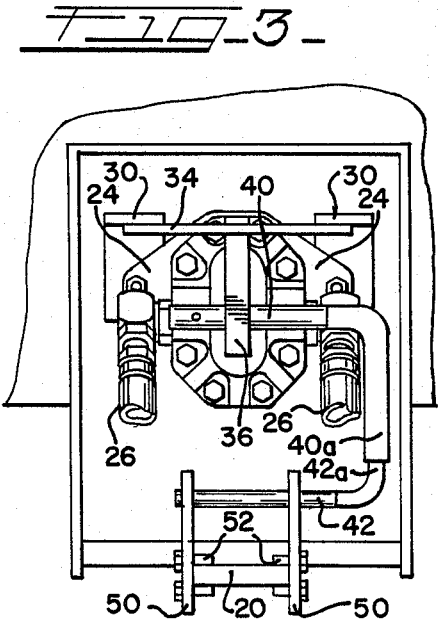

RETAINING BRACKET FOR DETACHABLE PUMP

TECHNICAL FIELD

This invention relates to tractor-drawn agricultural or construction implements and the auxiliary pumps for powering the same and, more particularly, to a novel retaining bracket for detachably connecting a hydraulic pump or the like to the power take off shaft of a tractor.

BACKGROUND OF THE INVENTION

A variety of mobile work performing implements, particularly agricultural implements such as planters, seed drills, harrows, and the like, are attachable to tractors for being drawn over the field of operations. The implement itself frequently requires a power source to provide air pressure, hydraulic pressure, or the like. For this purpose, the tractors are customarily provided with a power take off shaft to which auxiliary equipment can be attached.

Typically, a power take off shaft comprises longitudinal keys or splines on the surface thereof. The auxiliary piece of equipment, such as a hydraulic pump, is provided with a coupler structure having complementary grooves or splines adapted to matingly engage the power takes off shaft splines. Thus, the pump may be frictionally mounted on, or coupled to, the power take off shaft.

When connecting a hydraulic pump as described, it is necessary that the shaft of the pump be in longitudinal alignment with the power take off shaft. The pump must also be further supported by, or connected to, the tractor and be sufficiently flexible so that bouncing and jarring movements of the tractor do not result in bending or misalignment of the power take off and pump shafts.

In order to provide a flexible connection of the type described, known prior arrangements have utilized a metal retainer strap or rod connected to one side of the pump with a smooth bolt slidable in slotted openings. The opposite end of the strap was similarly connected to a portion of the tractor drawbar and both connections were retained by clips or pins inserted through holes in the bolts. While that type of connection required no tools and could be made by the farmer or other operator in the field, experience has shown that certain problems resulted therefrom.

The off-center connection and restraint of the retainer strap to the motor apparently imparted a bending moment of force to the pump shaft and its coupler structure. The characteristics of the forces involved caused destructive fretting of the power take off shaft splines and caused the coupler to seize on the power take off shaft. This resulted in an unacceptably shortened life for the pump coupler as well as destructive erosion of the power take off shaft.

Additionally, the farmer was required to make a fairly complicated connector strap adjustment in the field in order to precisely align the pump and power take off shafts. There thus exists a need for a means for detachably connecting a hydraulic pump or the like to the power take off shaft of a tractor which substantially eliminates the destructive bending forces encountered with prior retaining means. The attachment means should be non-rigid to provide the required flexibility and yet be readily and conveniently operable by the user without tools of any kind.

SUMMARY OF THE INVENTION

The present invention provides a retaining bracket for operationally mounting a hydraulic pump or the like to the power take off shaft of a tractor which substantially eliminates the problems alluded to.

The invention bracket is slidably attachable to the tractor drawbar and thus may be readily connected or removed without tools. When mounted to the tractor drawbar, the bracket automatically provides a non-rigid torque restraint for the pump shaft which is centered and in substantial alignment with the pump and power take off shafts. Thus, installation is greatly simplified and complicated field alignment is not required.

Briefly, the invention comprises a rigid harness-like frame which straddles the front, top and rear faces of the pump housing. The bracket comprises further a rigid, depending torque bar positioned behind the pump and in substantial alignment with the center line of the pump. A vertically oriented, channel-shaped connector or support has its upper leg slidably connected to the torque bar at a point in substantial longitudinal alignment with the centerline of the pump. The lower leg of the channel connector carries a pair of mounting posts having mounting means for sliding frictional engagement of the bracket on the drawbar of the tractor. The web of the channel connector also comprises a pair of telescopically arranged sections to permit limited vertical stability between the connector's legs.

When operationally mounted, the invention provides a centered and shaft-aligned torque restraint which prevents angular moments of force tending to bend the pump shaft or coupler. At the same time, the invention accommodates the limited flexibility required for operation in the field.

Numerous other features and advantages of the present invention will become readily apparent from the following detailed description, the accompanying drawings, and the appended claims.

BRIEF DESCRIPTION OF THE DRAWINGS

FIG. 1 is a fragmentary perspective view showing the invention operationally mounting a hydraulic pump to the power take off shaft and draw bar of a tractor;

FIG. 2 is a similar view of the inventive retaining bracket alone; and

FIG. 3 is an elevational view from the rear of FIG. 1.

DETAILED DESCRIPTION

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Referring with greater particularity to the Figures of the drawings, it will be seen that the reference numeral 10 indicates generally a retaining bracket embodying the principles of the invention. In FIGS. 1 and 3, the bracket 10 is shown operationally mounting a hydraulic pump 12 to the rear of a tractor shown fragmentarily at 15. The relevant portions of the tractor 15 comprise a power take off shaft 16 projecting rearwardly from a housing 18 and a draw bar 20 having an opening 22 for connection thereto of an agricultural implement or the like.

Hydraulic pump 12 is conventional and includes a pair of front mounting flanges 24, 24 and a central longitudinal shaft and coupler (not shown) by means of which the pump is operationally connected to the power take off shaft 16. Conventional hydraulic hoses 26, 26 are connected to the pump and extend rearwardly for operation of an implement to be connected to the tractor.

The retaining bracket 10 comprises a pair of structural side bars 30, 30, having integral, front depending segments 32, 32. A rear cross bar 34 is rigidly connected between the side bars 30, 30 and a torque bar 36 depends rigidly from the center of said cross bar. Support means comprising a channel connector 38 having an upper leg 40 and lower leg 42 connected by a web 44 is mounted from the torque bar 36 through an opening 46 formed in the torque bar.

The upper leg 40 and torque bar opening 46 preferably are of a complementary round configuration, the leg being slidably positioned through the opening and retained against removal by a pin or like 48. Similarly, the lower leg 42 is also preferably round in cross-section, and received through complementary round holes in its associated mounting components. This arrangement permits the channel connector 38 to be rotated forwardly and rearwardly relative to the torque bar 36, thus facilitating convenient mounting and use of the present retaining bracket on different implements.

A pair of vertical mounting posts 50, 50, is carried by the channel lower leg 42 and each of said posts carries a pair of vertically spaced mounting pins 52, 52. The vertical portion of lower leg 42 is preferably square or rectangular in cross-seciton, and of complementary configuration with the vertical portion of upper leg 40, but of smaller dimension and capable of fitting telescopically therein. As illustrated in the drawings, the web 44 this comprises the telescopically arranged sections 40a and 42a integral with the respective upper and lower legs 40 and 42, thereby further accommodating the desired positioning of mounting posts 50 along the associated draw bar 20.

Operation of the retaining bracket 10 should now be readily understood. The depending segments 32, 32 of the side bars 30, 30 are fixedly secured to the flanges 24, 24 of the pump 12 with bolts or the like. The dimensions of the side bars 30, segments 32 and torque bar 36 are such that the torque bar opening 46 is behind and in substantial alignment with the longitudinal axis of the shaft and coupler of the pump as well as the power take off shaft. When coupling the pump to the power take shaft, the mounting pins 52, 52 are positioned about the drawbar 20 to slidably engage the drawbar therebetween (see FIGS. 1 and 3).

During field operations, the central positioning of the opening 46 and connection between the torque bar and channel upper leg 40 provides a torque restraint, while minimizing bending moments between the pump shaft and coupler. At the same time, the sliding connections of channel connector 38 and the telescopic arrangement of the web 44 of the connector permit the limited flexibility required for such operations. Operational mounting of the pump 12 and bracket 10 may be conveniently made in the field without fine adjustments or the need for tools.

From the foregoing, it will be observed that numerous modifications and variations can be effected without departing from the true spirit and scope of the novel concept of the present invention. It is to be understood that no limitation with respect to the specific embodiments illustrated herein is intended or should be inferred. It is, of course, intended to cover by the appended claims all such modifications as fall within the scope of the claims.

What is claimed is:

1. In combination with a rotary pump having a pump shaft operationally attachable to a tractor having a power take shaft and an implement drawbar, a retaining bracket for the pump comprising:
   a framework rigidly secured to the pump housing and extending rearwardly therefrom, said framework including a rigid cross bar positioned behind said pump housing;
   a torque bar rigidly depending centrally from said cross bar and having an opening therein, said torque bar being in substantial alignment with the longitudinal axis of the pump shaft;
   a channel-shaped connector having an upper leg, a lower leg and a vertical interconnecting web, said upper leg being slidably received in said opening;
   a pair of mounting bars carried by the lower leg and spaced to accommodate the tractor drawbar therebetween; and
   vertically spaced mounting pins on each of said mounting bars adapted to slidingly engage the tractor drawbar therebetween.

2. A retaining bracket according to claim 1, wherein each of said legs comprises an integral vertical segment, said segments being slidably and telescopically arranged to form said web.

3. A retaining bracket according to claim 2, wherein said channel-shaped connector is round in section and said opening is of complementary configuration to slidably receive said upper leg therethrough.

4. A retaining bracket for a pump having a pump shaft adaptable to the power take-off shaft of a tractor comprising: a framework rigidly secured to the pump and having a member positioned rearwardly of the pump; said framework including a cross bar positioned behind the pump, and said member comprising a torque bar depending centrally from said cross bar, said torque bar having a connector opening therein, said torque bar being in substantial alignment with the longitudinal axis of the pump shaft; and support means comprising a channel-shaped connector having an upper leg, a lower leg and a vertical interconnecting web, said upper leg being slidably received in said opening; a pair of mounting bars carried by the lower leg and spaced to accommodate a drawbar of the tractor therebetween; and vertically spaced mounting pins on each of said mounting bars adapted to slidingly engage the tractor drawbar therebetween and providing a torque restraint which resists bending of the pump shaft during operation thereof.

5. A retaining bracket according to claim 4, wherein each of said legs comprises an integral vertical segment, said segments being telescopically arranged to form said web.

6. A retaining bracket according to claim 4, wherein said channel member is round in section and said connector opening is of complementary configuration.

* * * * *